United States Patent [19]

Berger et al.

[11] 4,412,632

[45] Nov. 1, 1983

[54] SELF-CLEANING VALVE

[76] Inventors: Richard F. Berger, 30 Cold Spring Hills Rd., Huntington, N.Y. 11743; Greg Pardes, 425 E. 58th St., New York, N.Y. 10022; Bernard R. Gerber, 172-12 133rd Ave., Jamaica, N.Y. 11434

[21] Appl. No.: 267,876

[22] Filed: May 28, 1981

[51] Int. Cl.³ ............................................. B05B 11/04
[52] U.S. Cl. ..................................... 222/148; 222/494
[58] Field of Search ............... 222/494, 212, 496, 497, 222/214, 96, 102, 128, 129, 148, 101; 251/6, 10

[56] References Cited

U.S. PATENT DOCUMENTS

| 2,755,974 | 7/1956 | Godfrey | 222/494 |
| 2,865,537 | 12/1958 | Jackson | 222/214 |
| 3,315,849 | 4/1967 | Herzig | 222/491 |

Primary Examiner—Stanley H. Tollberg
Attorney, Agent, or Firm—Toren, McGeady and Stanger

[57] ABSTRACT

A self-cleaning valve used at the outlet of a container has an elongated flexible flattenable outlet tube with an inlet for receiving material to be dispensed from the container, and an outlet for dispensing the material. In the at-rest condition of the valve, a pair of spring-biased rollers contact the opposite sides of the tube at a location spaced from the outlet end and hold the tube in a closed condition. When material is forced through the inlet end of the tube it pushes the rollers toward the outlet against the spring biasing action. At the outlet end the rollers separate and permit the tube to open so that the material can be dispensed. After the material has been dispensed, the springs return the rollers to the at-rest position and the rollers effect a self-cleaning action on the tube.

12 Claims, 4 Drawing Figures

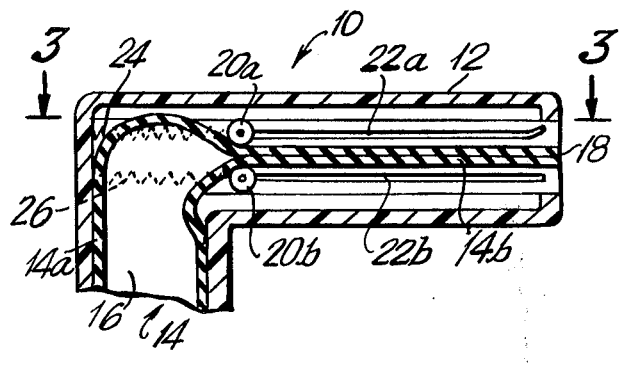
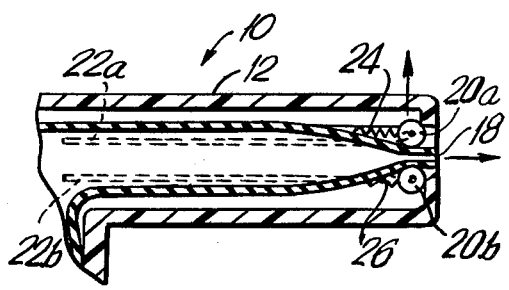
FIG.1  FIG. 2
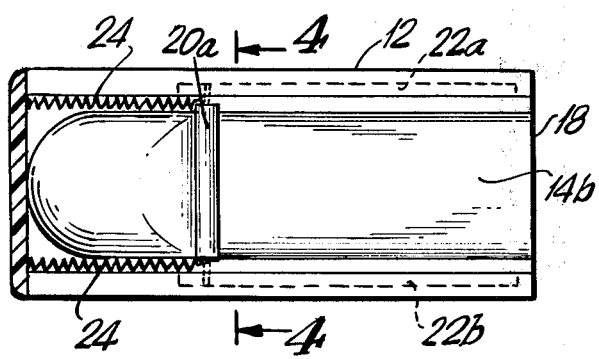
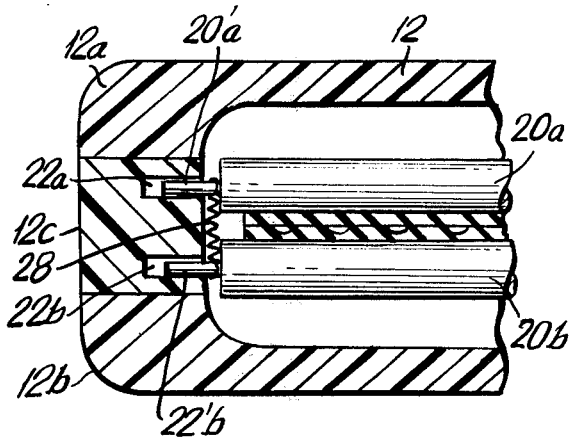
FIG. 3  FIG. 4

SELF-CLEANING VALVE

SUMMARY OF THE INVENTION

The present invention is directed to a self-cleaning valve for use on containers from which material is to be dispensed.

In the past valves have been proposed for collapsible containers which remain in the closed condition as long as a collapsing force is not applied to the containers for dispensing material. The material dispensed can be a liquid, a flowable solids, a paste, a solution, or a suspension which will flow when a collapsing force is applied to the container. The valve is also usable on containers where the material to be dispensed is forced out by a compressed gas or air. In such containers, a positive closure may be needed along with the valve to prevent any unintentional outflow.

When the container and valve are in the at-rest condition, the valve must provide a closure preventing air from entering the container. The passage of air into the container may have a deleterious effect on the material. If the material tends to build up in the passageway through the valve it may prevent proper closure of the valve allowing air to enter and possibly contaminate the material.

Therefore, it is the primary object of the present invention to provide a self-cleaning valve which clears the passageway out of the valve of any of the material being dispensed so that the valve closes properly.

Another object of the present invention is to provide a simple valve construction which can be easily and inexpensively manufactured and can be operated without any problems.

In accordance with the present invention, the outlet of a container is provided with a rigid housing with a valve enclosed within the housing. The valve consists of an elongated flexible flattenable outlet tube having an inlet end arranged to be connected to a container and an opposite outlet end from which material is dispensed after it passes through the outlet tube. In the at-rest condition of the valve, the tube is in the flattened position from the outlet end to a location intermediate the outlet end and the inlet end. In the at-rest condition, a pair of rollers are located at this intermediate location each on an opposite side of the outlet tube and the rollers bear against the outside surfaces of the tube and hold it in the flattened closed condition. The rollers are spring-biased within the housing into the intermediate location. Guide grooves are formed in the housing and the opposite ends of the rollers are rollably supported in the guide grooves. Upstream of the rollers the outlet tube is opened so that it can receive material to be dispensed from a container.

When material is forced out of the container into the inlet end of the outlet tube it provides a pressing force against the inside surface of the tube tending to open the flattened portion of the tube. The rollers are biased into the intermediate position on the tube and when the force generated by the material exceeds the biasing force of the springs, the rollers are pushed along through the guide grooves by this force. As the rollers move toward the outlet end of the outlet tube the interior of the tube opens from the flattened condition and the material continues to flow through it pushing the rollers ahead. When the rollers reach the outlet end of the tube, at least one of the guide grooves provides an offset section permitting the corresponding roller to move outwardly so that the end of the tube opens with the material being discharged.

After the discharging or dispensing force is released, the spring-biasing action on the rollers causes them to return through the guide grooves to the intermediate location on the tube. As the rollers return to the initial position they force the tube back into the flattened condition and any material within the tube is cleaned or cleared back to the intermediate location where the ends of the guide grooves act as stops for the rollers.

If any material remains in the tube between the outlet end and the intermediate location defining the at-rest position of the rollers, it is returned in the upstream direction through the outlet tube toward the inlet end. This cleaning action assures that the inside surface of the tube is completely flattened and forms a closure preventing any inflow of air or any outflow of the material from the container.

To assure that the rollers provide an adequate pressing force against the outside surface of the outlet tube when material is initially forced through the tube and when the dispensing operation is completed and the rollers are being returned to the starting position, springs mounted on the opposite ends of the rollers bias them toward one another.

Preferably, the outlet tube is formed of natural rubber or an elastomer including synthetic rubber or a plastics material. The material forming the outlet tube must have sufficient resilience so that it will open and close during multiple uses of the valve.

While the valve can be used with a variety of containers, in one preferred embodiment it is attached to the outlet end of a collapsible container such as disclosed in the Rauh et al U.S. Pat. No. 3,506,163. When used with such a container, the collapsing action causes the material to completely fill the container and the valve up to the closure provided by the rollers in the at-rest position. The action of the rollers combined with the flexible flattenable characteristic of the material forming the outlet tube assures that the valve affords a complete seal preventing any flow of material out of the container when no collapsing force is acting on it and preventing any flow of air into the container.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a cross-sectional view of a self-cleaning valve embodying the present invention and shown in the at-rest condition;

FIG. 2 is a sectional view similar to FIG. 1 showing the self-cleaning valve in the opened or dispensing condition;

FIG. 3 is a view, partly in section, taken along the line 3—3 in FIG. 1; and

FIG. 4 is a partial enlarged sectional view taken along the line 4—4 in FIG. 3.

DETAIL DESCRIPTION OF THE INVENTION

In the drawings a self-cleaning valve 10 is shown including a rigid L-shaped housing 12 enclosing an axially elongated flexible flattenable outlet tube 14 arranged within the housing and also being generally L-shaped.

Outlet tube 14 has an inlet end 16 and an outlet end 18. In the at-rest condition as is shown in FIG. 1, the opposite sides of the outlet tube are flattened so that half of the inside surface of the passageway contacts the other half blocking off flow therethrough either from the inlet end 16 or the outlet end 18.

In the at-rest condition, a pair of rollers 20 are mounted in the housing 12, one above and the other below the tube 14. The housing has two pair of guide grooves 22a, 22b with each pair having a groove located on opposite sides of the housing and extending in the axial direction of the tube 14.

The opposite ends of roller 20a are rollably or slidably mounted in the grooves 22a while the opposite ends of the roller 20b are similarly mounted in the grooves 22b. A spring 24 is connected to each of the opposite ends of the rollers 20a, note FIG. 3, biasing the roller away from the outlet end. Similarly, a pair of springs 26 bias the lower roller 20b away from the outlet end.

In FIG. 4 it can be seen that pins 20'a extend from the roller 20a into the guide grooves 22a. Similarly pins 20'b extend from the roller 20b into the guide grooves 22b. At each end the rollers are biased toward one another by a spring 28 so that the rollers press against the outside surface of the tube 14 and hold the opposite halves of its inside surface, forming the passageway through the tube, in contacting engagement.

As illustrated in FIG. 4, the housing 12 is made up of an upper portion 12a, a lower portion 12b and an intermediate side portion 12c in which the guide grooves 22a, 22b are formed. The housing is made up of separate sections to facilitate the formation of the guide grooves and the assembly of the valve. The housing, however, could be formed of one integral wall. Preferably, the housing is formed of a hard plastics material so that it provides adequate support for the rollers and the tube.

As viewed in FIG. 1, the right-hand end of upper guide groove 22a is bent upwardly away from the outlet end 18 of the tube 14. The right-hand end of each of the guide grooves 22a and 22b afford a stop limiting the movement of the rollers in the direction toward the outlet end 18 of the tube 14.

The tube 14 can be formed of a number of different flexible materials, such as natural rubber or elastomers and the elastomers may be either synthetic rubber or plastics materials having the requisite resilient characteristic. Normally, at its inlet end 16, the tube has a generally circular passageway 14a, however, between the at-rest location of the rollers 20a,20b to the outlet end 18, the tube is flattened so that the halves of its inside surface contact one another in the manner shown in FIG. 4.

The inlet end of 16 of the tube 14 is connected to a container, not shown, holding a supply of material to be dispensed through the valve and out its outlet end 18. The material may be a flowable solids, a liquid, a paste, a solution or a suspension.

When the material is to be dispensed out of the valve 10, pressure is applied to the material so that it flows into the inlet end 16 of the tube 14 and against that portion of the tube immediately adjacent the upstream side of the rollers 20a, 20b. The desired force moving the material can be a compressed gas, air or it can be provided by a collapsing pressure acting on a collapsible container. As the force of the material contacts the rollers, if it is sufficient to overcome the biasing force of the springs 24, 26, it causes the rollers 20a, 20b to roll along the guide grooves 22a 22b toward the outlet end 18. As the rollers proceed toward the outlet end, the passageway in the tube 14 opens from the flattened condition of FIG. 1 to the open condition of FIG. 2. When the rollers finally reach the ends of the guide grooves 20a, 20b adjacent the outlet end 18, the upper roller 20a moves into the upwardly bent end of guide grooves 22a permitting the flattened end of the tube 14 at the outlet end 18 to open, such as shown in FIG. 2. As long as the dispensing force is maintained, the material is discharged through the outlet end 18.

When the dispensing force is discontinued, the biasing force of springs 24, 26 takes over and starts to move the rollers 22a, 22b back to the at-rest position shown in FIG. 1. Initially, roller 22a moves downwardly through the upwardly bent end section of the guide grooves 22a forcing the tube back into the closed flattened condition. Any material in the outlet end 18 of the tube 14 is pressed out of the outlet end. As the rollers 20a, 20b move through the guide grooves 22a, 22b back toward the at-rest position any material located within the passageway in the tube in its section 14b is moved ahead of the rollers and returns back into the inlet end 16 of the tube 14.

The spring 28 biases the rollers 20a, 20b toward one another as they move through the guide grooves 22a, 22b so that in the at-rest position of FIG. 1 the rollers press against the tube 14 maintaining it in the flattened condition and providing a closure so that there is no flow of material outwardly through the tube 14 nor any flow of outside air or other contaminates in through the outlet end 18 and the tube 14 into the container to which the tube is connected.

The housing 10 protects the valve and assures that the rollers continue to operate effectively.

The self-cleaning action of the valve 10 assures that there is no build-up of material in the section 14b of the tube 14 which would prevent the formation of a seal against flow either out of of into the container to which the valve is connected.

While the housing 12 and the section 14b of the tube 14 are shown of a uniform width over the length of the valve, it would be possible to provide other configurations as long as the desired self-cleaning and valve closure effects are afforded.

While specific embodiments of the invention have been shown and described in detail to illustrate the application of the inventive principles, it will be understood that the invention may be embodied otherwise without departing from such principles.

We claim:

1. Self-cleaning valve for use at the outlet of a container for dispensing a material from the valve comprising an axially elongated flexible flattenable outlet tube having an inlet end through which the material enters the valve and an outlet end from which the material is dispensed after passing through said outlet tube with the axis of said outlet tube extending in the inlet end-outlet end direction, said outlet tube having an at-rest condition and a dispensing condition, said outlet tube forms a passageway between said inlet end and said outlet end, said passageway in the at-rest condition of said outlet tube is flattened for a portion of the axial length of said tube forming a closure of said passageway blocking flow through said valve, in the dispensing condition the force of the material being displaced from a container through said valve opens the flattened section of said passageway so that the material can flow out of said outlet end, means for maintaining said passageway in said tube in the flattened condition in the at-rest condition of said valve including first means in aligned contact with opposite sides of said outlet tube at a location spaced from said outlet end and for moving in the axial direction of and relative to said outlet tube from the location of the at-rest condition to the outlet end of said outlet tube with said first means remaining in opposite aligned contact with said outlet tube whereby said valve is in the dispensing condition for permitting flow out of the outlet end of said tube and for effecting a cleaning of the flattened section of said outlet tube at the termination of the dispensing operation.

2. Self-cleaning valve, as set forth in claim 1, wherein said means comprises a housing laterally enclosing said outlet tube and said first means comprises rollers mounted in said housing for movement relative to said outlet tube and for flattening said outlet tube so that said passageway therethrough is closed in the at-rest condition.

3. Self-cleaning valve, as set forth in claim 2, wherein said housing comprises a pair of side walls extending in the elongated direction of said outlet tube from the outlet end of said tube toward the inlet end thereof, spaced guide grooves are formed in the surface of said side walls facing toward said outlet tube, and a pair of rollers extend between said side walls and are rollably mounted in said guide grooves, and said guide grooves extend from adjacent said outlet end of said tube to an at-rest position intermediate the inlet end and the outlet end of said tube.

4. Self-cleaning valve, as set forth in claim 3, wherein said side walls of said housing containing said grooves extend from approximately said outlet end of said tube toward the inlet end of said tube.

5. Self-cleaning valve, as set forth in claim 4, wherein said guide grooves in said side walls being spaced apart so that said rollers rollably mounted therein contact the outside surface of said outlet tube and press said outlet tube into a flattened condition with the inside surface defining the passageway through said outlet tube being in contacting sealing engagement.

6. Self-cleaning valve, as set forth in claim 3, including first spring means mounted in said housing and secured to said rollers for biasing said rollers away from the outlet end of said tube so that when said rollers are displaced to the ends of said guide grooves closer to said outlet end of said tube and the dispensing pressure no longer acts on the material, said first spring means returns said rollers to the at-rest position.

7. Self-cleaning valve, as set forth in claim 6, including second spring means secured to and extending between said rollers for biasing said rollers toward one another so that said rollers press against the outside surface of said outlet tube.

8. Self-cleaning valve, as set forth in claim 3, wherein said guide grooves extend in parallel relation in said side walls of said housing, at least a pair of said guide grooves supporting one of said rollers having an outwardly bent section at the ends thereof adjacent said outlet end of said outlet tube so that when said rollers are displaced to adjacent the outlet end of said outlet tube the one of said rollers moves outwardly away from the other permitting the flattened tube to open and discharge material from said outlet end.

9. Self-cleaning valve, as set forth in claim 2, wherein said outlet tube is L-shaped in the elongated direction and has a first section extending from said outlet end of said outlet tube and a second section forming said inlet end and disposed approximately perpendicularly of said first section.

10. Self-cleaning valve, as set forth in claim 9, wherein said housing is L-shaped.

11. Self-cleaning valve, as set forth in claim 7, wherein each of said rollers includes an axially extending pin at each end projecting outwardly from said roller and arranged to fit in rolling contact within the corresponding guide groove, and said second spring means being connected to the pins at the corresponding ends of said rollers for biasing said rollers toward one another.

12. Self-cleaning valve, as set forth in claim 5, wherein said guide grooves are disposed in parallel relation with one another.

* * * * *